United States Patent [19]

Rodriguez

[11] Patent Number: 5,644,977

[45] Date of Patent: Jul. 8, 1997

[54] DRUM COOLER

[76] Inventor: Henry Rodriguez, 7066 N. Rodriguez Rd., McNeil, Ariz. 85617

[21] Appl. No.: 528,324

[22] Filed: Sep. 14, 1995

[51] Int. Cl.$^6$ ..................................................... A23L 1/00
[52] U.S. Cl. ........................... 99/517; 99/348; 99/427; 99/443 R; 99/470; 134/142; 134/153; 366/214; 366/235
[58] Field of Search ............................. 99/352–356, 348, 99/359–371, 427, 443 C, 443 R, 470, 483, 516, 517; 366/144, 146, 214, 235; 134/142, 153, 159; 62/374, 378, 381; 165/109.1; 422/300–304

[56] References Cited

U.S. PATENT DOCUMENTS

| | | | |
|---|---|---|---|
| 3,302,655 | 2/1967 | Sasaki et al. | 134/142 |
| 3,500,979 | 3/1970 | Hammer | 134/142 |
| 3,614,924 | 10/1971 | Hickey | 134/159 X |
| 3,933,313 | 1/1976 | Waite . | |
| 4,044,951 | 8/1977 | Waite . | |
| 4,098,095 | 7/1978 | Roth . | |
| 4,137,835 | 2/1979 | Petersen | 99/348 |
| 4,157,061 | 6/1979 | Margus, Jr. | 99/352 |
| 4,174,722 | 11/1979 | Fleenor, et al. | 134/142 X |
| 4,301,718 | 11/1981 | Lewinger | 99/359 |
| 4,329,068 | 5/1982 | Neuner | 366/214 |
| 4,385,035 | 5/1983 | Akitoshi et al. | 99/348 |
| 4,446,779 | 5/1984 | Hubbard | 99/472 |
| 4,462,221 | 7/1984 | Roullet . | |
| 4,565,452 | 1/1986 | Wild . | |
| 4,702,161 | 10/1987 | Andersen . | |
| 4,720,194 | 1/1988 | Friedland | 366/235 |
| 4,723,377 | 2/1988 | Watts | 134/153 X |
| 4,860,461 | 8/1989 | Tamaki . | |
| 5,016,362 | 5/1991 | Nakamura . | |
| 5,119,720 | 6/1992 | Rodriguez . | |
| 5,156,006 | 10/1992 | Broaderdorf . | |
| 5,156,020 | 10/1992 | Baggs . | |
| 5,174,431 | 12/1992 | Abler . | |
| 5,184,471 | 2/1993 | Losacco . | |
| 5,220,812 | 6/1993 | Palbiski . | |
| 5,341,729 | 8/1994 | Zittel . | |
| 5,562,114 | 10/1996 | St. Martin | 134/153 X |

Primary Examiner—Timothy F. Simone
Attorney, Agent, or Firm—LaValle D. Ptak

[57] ABSTRACT

In a multi-station machine (10) each station (23,24,25,26) is configured to receive through a gate (90) of a drum encircling holder (50) a sealed 55 gallon drum (200) full of hot cooked food which is supported about its periphery at its midpoint (203) between its two central ribs (201,204) on a plurality of vertical padded (58) stanchions (55,71,84,91) affixed to the drum encircling holder. The holder is rotatably supported (52,81) at its sides in a support frame (40). A variety of pulley drives (110,130,150,160) connect to a central drive (100,105) to rotate each holder (and drum) independently of all others, or in linked fashion, as desired. Cold water (306,307) is sprayed (300) on each rotating drum from individual overhead sprayers (302,303,304) for each station.

12 Claims, 5 Drawing Sheets

DRUM COOLER

BACKGROUND OF THE INVENTION

Fields of the Invention

The present invention relates to an apparatus for cooling large, sealed, hot drums, more particularly, to an apparatus for cooling 55 gallon drums and the food contents thereof by spinning the drums in a cold water spaying environment.

a. Food Industry Large Containers

In the food processing industry, it is common to prepare many products in sealed containers. Typical products include fruits and vegetables, as well as various condiments which typically are packed in liquid. The products are placed in containers along with any liquid and the containers are sealed. Processing typically is completed by heating the containers to a temperature of about 200° F., for the purpose of cooking the ingredients and destroying any bacteria which may be present. In some cases, the containers are first steam heated to about 210° F.–212° F. to insure that they are bacteria free and then are hot filled with the cooked product at the elevated temperature and then, immediately subsequent to filling, are sealed.

Immediately after the sealing and heating of the containers are completed and while the containers are at a temperature not less than about 196° F., the containers are cooled to prevent thermophilic spoilage and also to ensure that the end product in the container is as firm or crispy as possible. It has been found that the faster the entire contents of the container can be cooked or heated and then cooled, the better is the quality of the end product when the container subsequently is opened for consumption.

There is a need in the food processing industry for a variety of products packaged in large containers, such as fifty-five gallon drums. For example, chilies and similar products are "canned" in fifty-five gallon drums for sale to food processors who then utilize the contents of such drums in further processing, such as in making salsa. Also, foods packaged in fifty-five gallon drums are utilized by high volume restaurants and the like, since it is much more economical to purchase such foods in fifty-five gallon drum containers than in a large number of smaller containers.

The problems of minimizing the heating and cooling times of foods processed in hot, full, fifty-five gallon drums are significantly multiplied over those which exist for small containers, simply by virtue of the fact of the large size of the drums and the large amount of food which is contained in the drums, typically weighing over five hundred pounds.

The present invention solves the problem of rapidly cooling the hot 55 gallon drums and the food contents thereof. For a description of the drum mover utilized to allow an operator to easily pick up the hot drum by himself from the drum filling station and quickly move it to an empty station in the drum cooling machine of the present invention, the reader is referred to applicant's co-pending application entitled A Hand Truck For Moving Large Drums.

Discussion of Background and prior art

The prior art apparatuses for cooling hot 55 gallon drums filled with cooked food products are best exemplified by applicant's prior U.S. Pat. No. 5,119,720 entitled Apparatus for Processing Products in Large Sealed Drums. The apparatus of that invention is an upright main frame spinning structure into which the hot, full, 55 gallon drums were radially loaded onto the structure with their vertical axis upright resembling spokes in a spinning wheel or an amusement park ferris wheel. When 6 drums are loaded, the structure is continuously rotated at about 15 rpm in a cooling water spray to rapidly cool the drums and their food contents, such as, chili to about 100° F. in about 1.5 hours. The problems with this structure are that it is expensive to construct, a substantial amount of time is lost loading and unloading the drums, and there is too little agitation of the drum contents. Also, to maintain the balance of the system, it was preferred that always an even number of full drums be loaded prior to use.

It is an object of the present invention to allow for the hot, full, 55 gallon drums to be quickly and easily loaded into and unloaded out of a station of an inexpensive cooling structure and be more rapidly rotated therein independently of all other drums in similarly configured stations of the machine without unbalancing the system, whereby cooling is rapidly an effectively accomplished for each drum with increased content agitation in an improved heat exchange apparatus for a food processing operation.

SUMMARY OF THE INVENTION

Set forth below is a brief summary of the invention in order to achieve the forgoing and other benefits and advantages in accordance with the purposes of the present invention as embodied and broadly described herein.

One aspect of the invention is a drum cooler which includes a support, a drum encircling holder having a central axis, rotatably mounted on each side on the support at the central axis, and having an openable and releasably latchable gate portion, a drive assembly mounted on the support and coupled to the drum holder for selectively rotating the drum holder about the drum holder central axis, and a water sprayer supported near the holder for spraying water onto the holder during rotation of the holder.

In further features of this aspect of the invention, the drum encircling holder may include a U-shaped frame the open end of which is closed by the gate, a plurality of vertical median supports mounted on the frame and the gate having inwardly slanted ends and adapted to support a drum by engaging a pair of central drum ribs, and a flexible, non-abrasive padding on the inboard side of the median supports.

In a further feature of this aspect of the invention, the drive assembly includes a central drive shaft, a central pulley affixed to the central drive shaft, a pulley affixed to the drum holder, a belt coupling the central and holder pulleys, an intermediate pulley movable between a first position disengaged from the belt and a second position engaged with the belt for driving the holder pulley, means for driving the central shaft, and a spring mounted between the movable pulley and the support for resiliently biasing the movable pulley into the engaged position.

Figure 1:
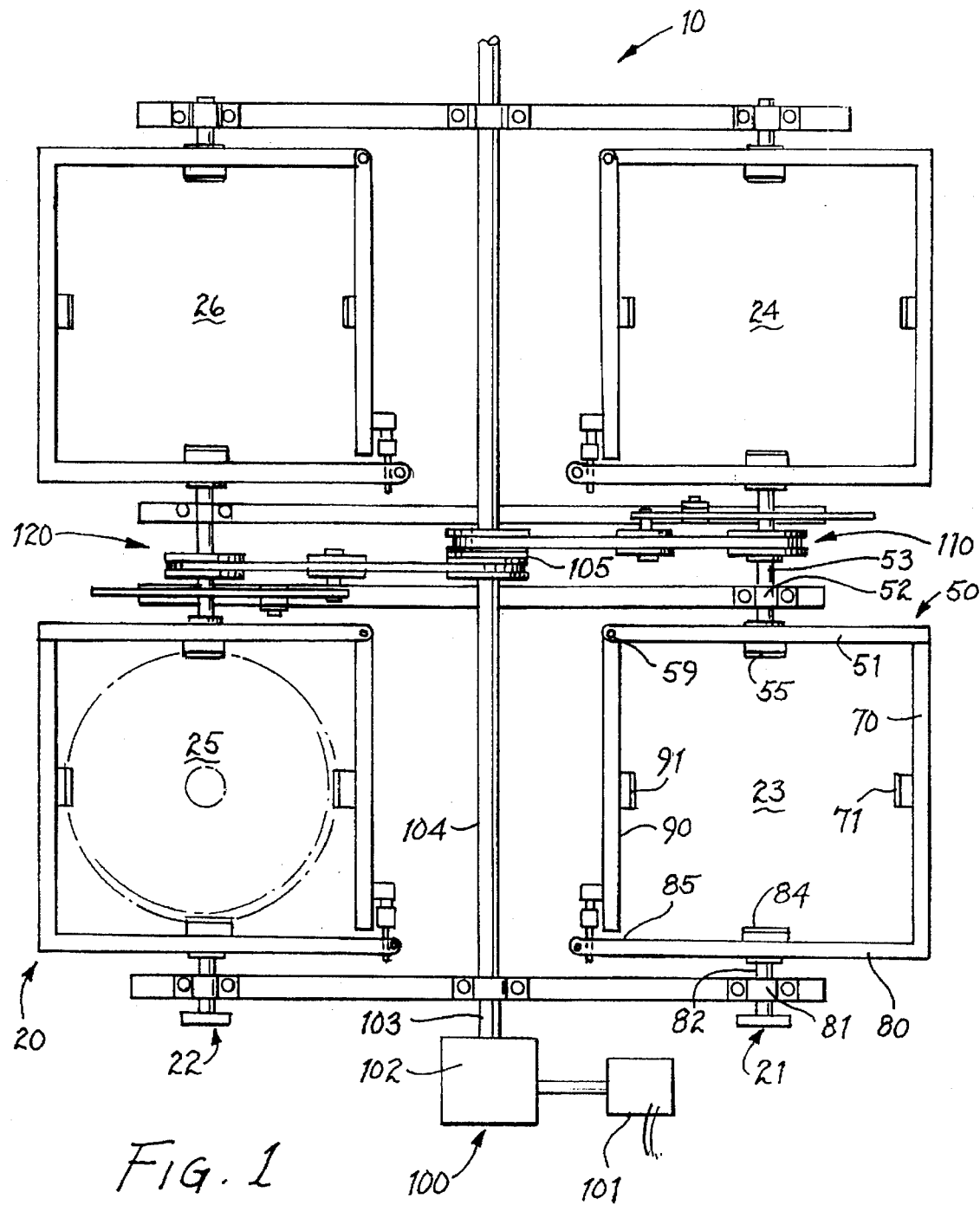
FIG. 1 is a plan view of the machine of the present invention showing the layout of module 1 which includes stations 1–4 with a first embodiment of the pulley drive assembly driving drum holders of the present invention in pairs.

DETAILED DESCRIPTION OF THE PREFERRED EMBODIMENT a. Overview

As best seen in FIGS. 1, 3, 6, 7, and 8 the overall system includes a drum cooler machine 10 which is comprised of a plurality of four-station modules 20. Module One 20 is the first module of 4 drums encircling holders 50 arranged in two rows. Looking from the right side of FIG. 1 and referring to that direction as the front of the machine, the front row 21 includes Station One 23 and Station Three 24. The rear row includes Stations Two 25 and Station Four 26. Machine 10 may include additional modules identical to Module One 20 so that the machine in the overall is comprised of a number of modules disposed end-to-end to form two long rows of drum encircling holders 50. A typical machine comprises 4 modules with a total 16 stations arranged with 8 stations in the front row and 8 stations in the rear row.

Figure 3:
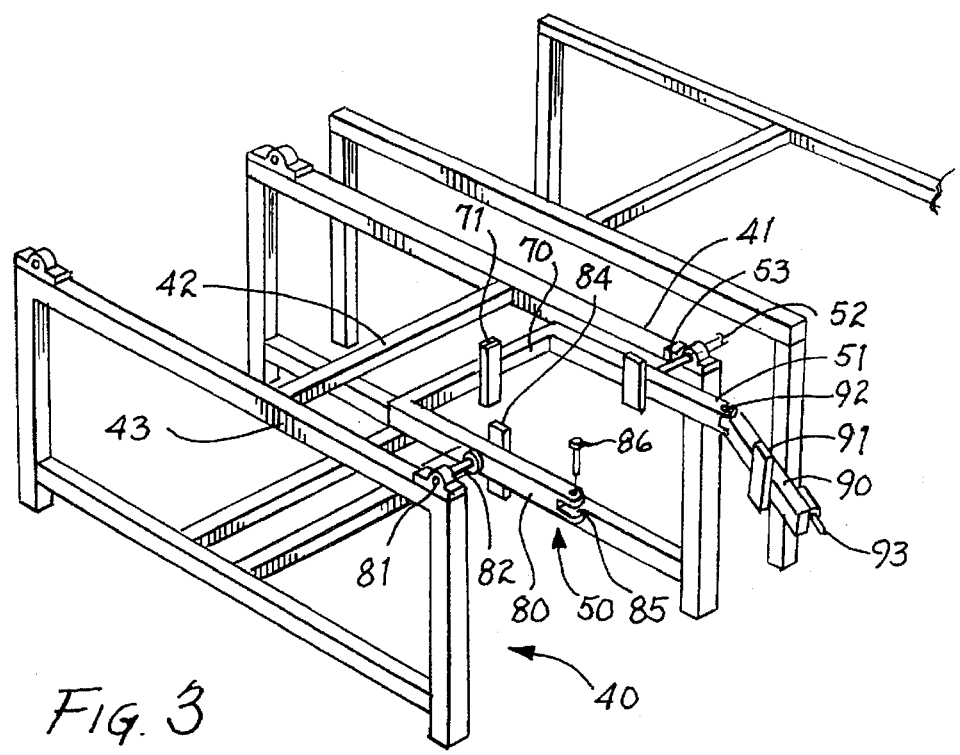
FIG. 3 is a perspective view of station 1 of module 1 showing the drum encircling holder of the present invention.

As best seen in FIG. 3, Station One 23 of Module One is supported by an underlying U-shaped frame 40 which includes a right side frame member 41 attached to a center frame member 42 which is attached to a left side frame member 43. Right and left side frame members 41,43 of Station One 23 are extended rearwardly to form similar portions of Station Two 25. Center frame member 42 of Station One 23 is extended rightward and forms the corresponding center frame member for the adjacent pair of stations to the right, namely, Stations Three 24 and Station Four 26. This frame construction is repeated for each succeeding module of the machine.

As best seen in FIGS. 1,3, each station is comprised of a drum encircling holder 50 each of which includes a gate portion 90 and which is rotatably mounted at its sides in bearing mounts 52,81. Each drum encircling holder 50 supports a drum 200 on vertical stanchions 55,71,84,91, surrounding the drum waistline 203. Each module includes a module drive mechanism 100 to which is coupled a station drive mechanism 110 (FIGS. 1,3). For station 23 drive 110 is coupled to the shaft 53 of drum holder 50. A tensioner assembly 130 (FIG. 5) or a modified version thereof as shown in tensioner assembly 150 (FIG. 6) puts tension on the drive belts 122,152 to rotate the holder pulleys 121 or 151 attached to the shaft of drum holder 50 to rotate the holder and the drum 200 supported therein. The other stations 24,25,26 of the module are similarly driven by either of the two types of drive assemblies 130,150. As further described below, drive pulley assembly 150 (FIG. 6) is the preferred mode of the invention.

The machine 10 includes a sprayer assembly 300 (FIG. 7) and water supply system 310 for spraying cool water through a pair of overhead supported spray bars 302,303 with individual sprayers 304 disposed over each drum encircling holder assembly for cooling the drum and its food contents.

The individual portions of the system will now be described in greater detail below.

b. Drum Holder Assembly

Figure 8:
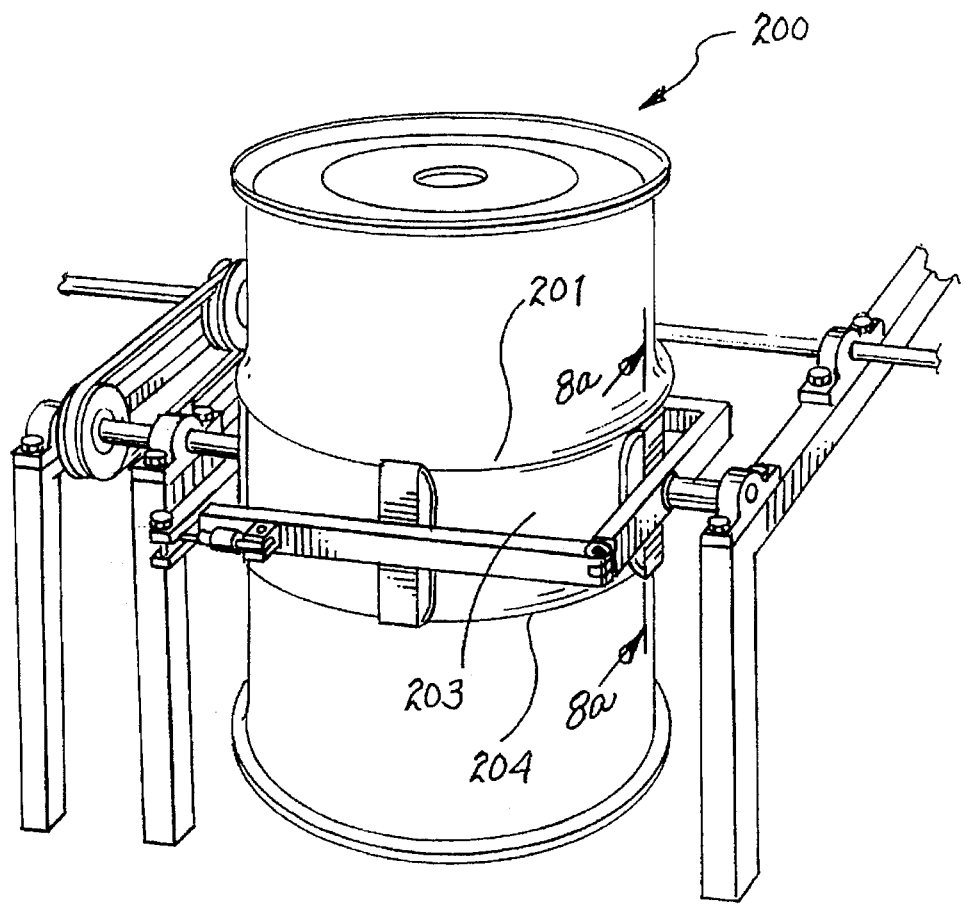
FIG. 8 is a perspective view of the drum holder mechanism of FIG. 3 holding a drum in an upright loaded position ready for rotation and cooling.
Figure 8A:
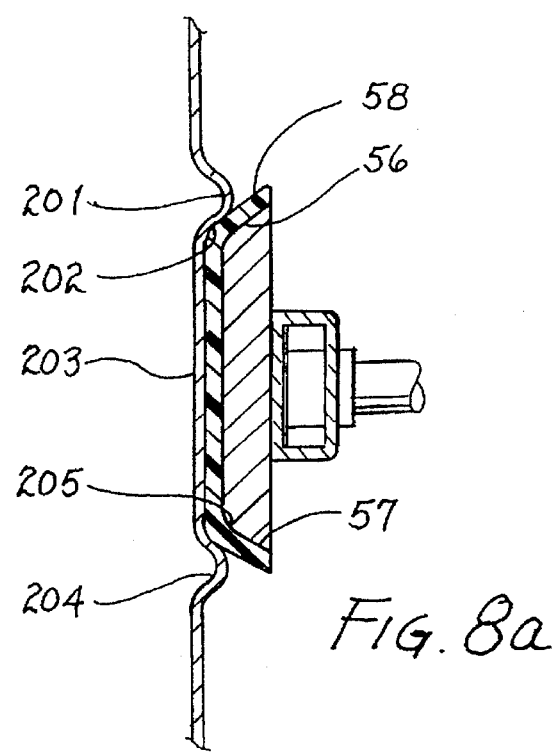
FIG. 8a is a partial sectional view along the lines 8a—8a of FIG. 8.

As best seen in FIG. 3 drum encircling holder 50 of Station One 23 includes a right support member 51 attached to a shaft 53 rotatably supported in a right side bearing 54 (not shown) in a bearing mount 52. Affixed to the midpoint of right support member 51 is vertical stanchion member or vertical median support 55 which has inwardly angled ends 56,57 (FIG. 8a). The inner surfaces of vertical stanchion 55 are covered by a non-abrasive, soft coating or padding 58 (FIG. 8a). Support 51 is attached at its rear end to one end of an identical rear support member 70 to which is affixed vertical stanchion 71 at its midpoint. The front end of support 51 is adapted to be hinged 59 to the right end hinge point 92 of front support member 90. The left end of rear support member 70 is affixed to the rear end of left support member 80 which is also identical to right support member 51 and carries stanchion 84 at its midpoint. Left support member 80 is affixed to shaft 82 and rotatably supported in bearing 83 (not shown) in left bearing mount 81. The front end of left support member 80 is configured to be latched 85 to the left end 93 of front support member 90. Front support member 90 includes a vertical stanchion 91 affixed at its midpoint identical to the other vertical stanchions 55,71 and 84. All of the vertical stanchions are covered with a non-abrasive, soft coating or padding, such as padding 58 on stanchion 55.

Accordingly, front support member 90 is the gate for the U-shaped frame formed by the other three support members 51,70,80. The drum encircling holder 50 forms a box-like frame the central axis of which passes through the right and left vertical stanchions 55,84 shafts 53,82 and bearing mounts 52,81.

To load the drum encircling holder 50, the holder 50 is rotated so that the gate 90 is to the front of the station as shown in FIG. 3 and the gate is unlatched and opened. Using a drum mover of the type described in applicant's co-pending application entitled A Hand Truck for Moving Large Drums, the operator carries on the drum mover described therein a hot, loaded drum and positions it inside the U-shaped drum encircling holder 50 against the vertical stanchions 55,71 and 84 thereby supporting the drum therein. The vertical stanchions engage the drum at its midpoint 203 on the underside 202 of upper middle rib 201 and on the upper side 205 of lower middle rib 204 adjacent the central cylindrical wall 203 of the drum 200 (as shown in FIG. 8). With the drum supported therein, the drum mover is readily withdrawn and the gate 90 is closed and latched, positioning vertical stanchion 91 in its support position between drum ribs 201,204 as seen in FIG. 8. As thus positioned, drum 200 is now firmly secured within the drum encircling holder 50 and is balanced therein on its transverse axis for rotation without causing any eccentric forces so long as the drum is substantially full and rotated at a speed which allows the contents therein to gradually mix and move about as the drum is rotated. Applicant has found that a drum rotational speed of 30–40 rpm, using cold water as more fully described below, allows the drum contents to cool to about 100° F. within about 45 minutes.

The preferred material for constructing the frame 40 and drum holder 50 is tubular steel or aluminum and is standard in the industry.

The flexible, non-abrasive material 58 padding the vertical medians 55,71,84 and 91 is preferably elastic, pliable and malleable as well as non-abrasive so that it does not scratch or damage the exterior surface of the drum and molds itself to the contour of the drum between the middle external ribs 201,204 and adjacent drum's central cylindrical wall 203. A soft, durable resin material, known as HWM in the trade, which is a urethane material available in thicknesses of about ⅛" to ¼" has been found satisfactory.

The drum holder of the other Stations in the Module One 24,25,26 are identically constructed to drum encircling holder 50 of Station One 23.

Figure 4:
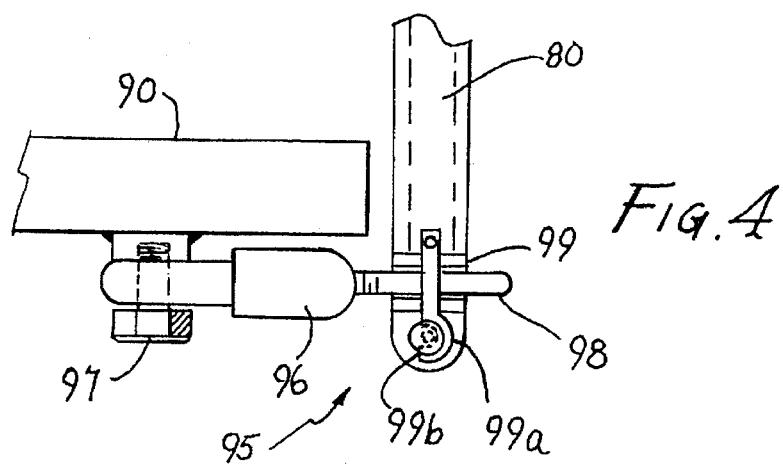
FIG. 4 is a modified form of the latch assembly used to close the front gate of the drum encircling holder of FIG. 3.

Virtually any type of positive latch may be used in the present invention to close gate 90 tightly and securely. As one example, a simple pin 86 inserted into a pair of holes in the front end 85 of left support 80 to capture and hold the protruding end of a bolt 94 at the latch end 93 of the gate 90 is satisfactory. As seen in FIG. 4 a modified form of latch may be used. Here, the end of gate 90 is latched to the end of support member 80 by a conventional well known latch means 95. Latch 95 comprises a latch bar 96 rotatable about a pin 97 in gate 90 which includes an adjustable threaded end member 98 screwed into the end of bar 96 that it may be lowered into a U-shaped slot 99 and locked therein by moving lever 99a over latch pin 99b attached to the front end of left support member 80.

c. Module Drive Mechanism

Module One 20 is driven by module drive mechanism 100 which includes a central hydraulic motor 101 driving a central transmission 102 which is coupled 103 to a central shaft 104 to which is affixed central double pulley 105 which serves the purpose of providing a central drive to all stations 23,24,25,26 of Module 20. Similarly, shaft 104 is extendable (upwardly as shown in FIG. 1) to provide a central drive shaft for each additional module connected in tandem to Module One.

Figure 5:
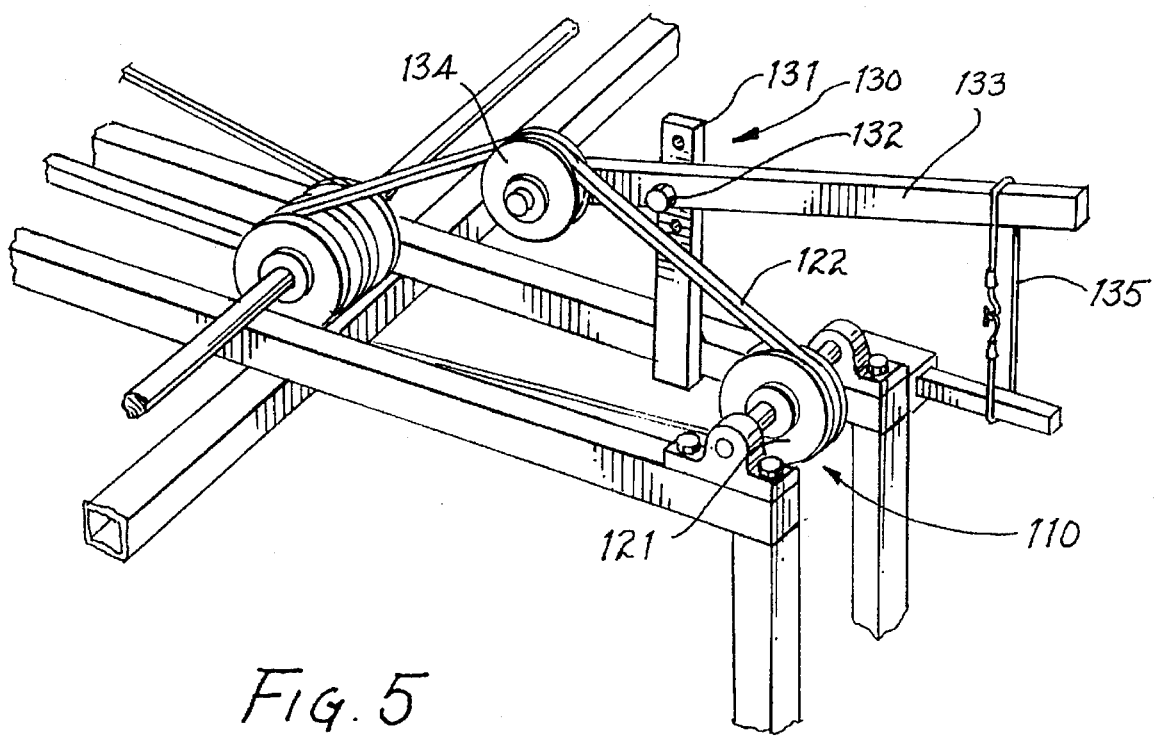
FIG. 5 is a perspective view of the drive pulley assembly of FIG. 1.

In one embodiment of the invention shown in FIGS. 1,5 the front pair of Stations One and Three 23,24 are simultaneously driven by a common station drive mechanism 110 and the pair of rear Stations Two and Four 25,26 are simultaneously driven by a common station drive mechanism 120 which is identical to station drive mechanism 110.

Station drive mechanism 110 includes a common pulley 121 affixed to the common shaft 53 to which is affixed the drum encircling holders 50 of Stations One and Three 23,24. Station drive mechanism 110 further includes a belt 122 coupled to ½ of central double pulley 105 and to pulley 121 of Station One 23, and tensioner assembly 130 mounted to frame 40 if Station 23. Tensioner assembly 130 includes a vertical support member 131 affixed to left side frame member 80 of adjacent Station Three 24 to which is pivotably connected 132 an arm 133 having at its inboard end a pulley 134 coupled to belt 122. Resilient hold down member 135 is connected between a frame portion and arm 133. Arm 133 is movable about pivot 132 between an upward position disengaging pulley 134 from belt 122 and a downward position engaging pulley 134 with belt 122 to drive pulley 121 and simultaneously spin drum encircling holders 50 of both Stations 23,24. In an alternative construction (not shown) resilient hold down 135 may be positioned such that it moves over center relative to pivot point 132 so as to resiliently hold arm 133 in the up or down position until it is manually moved therefrom by the operator.

Figure 2:
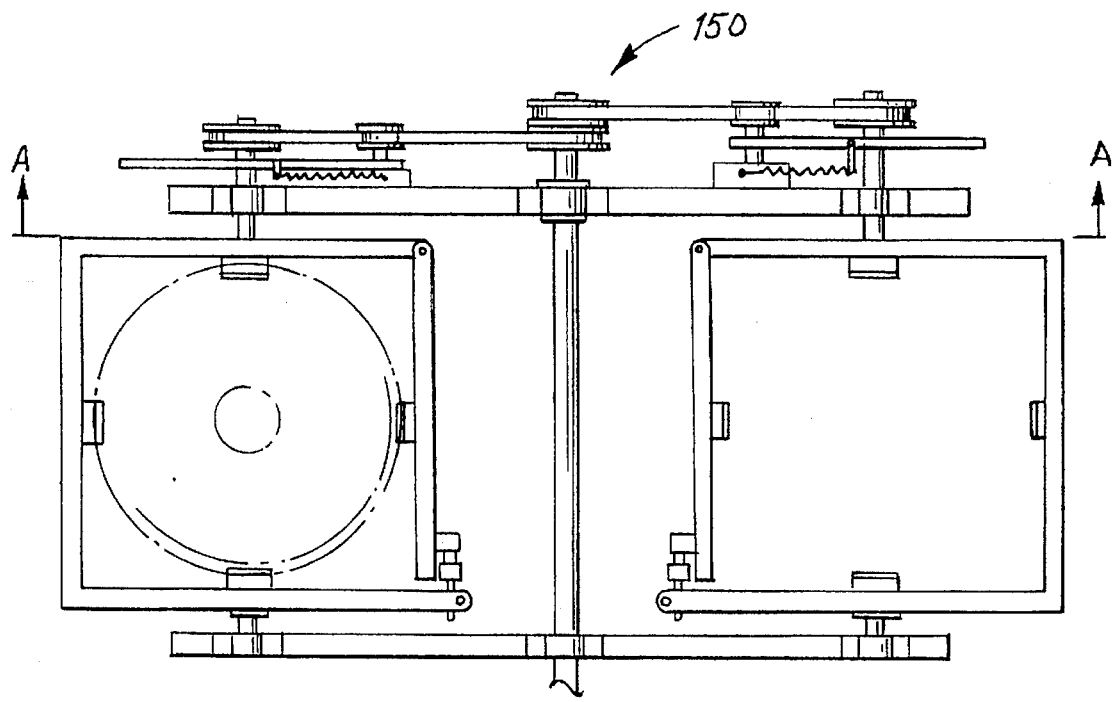
FIG. 2 is a plan view of a modified form of the pulley drive assemble driving drum holders of the present invention singly.
Figure 6:
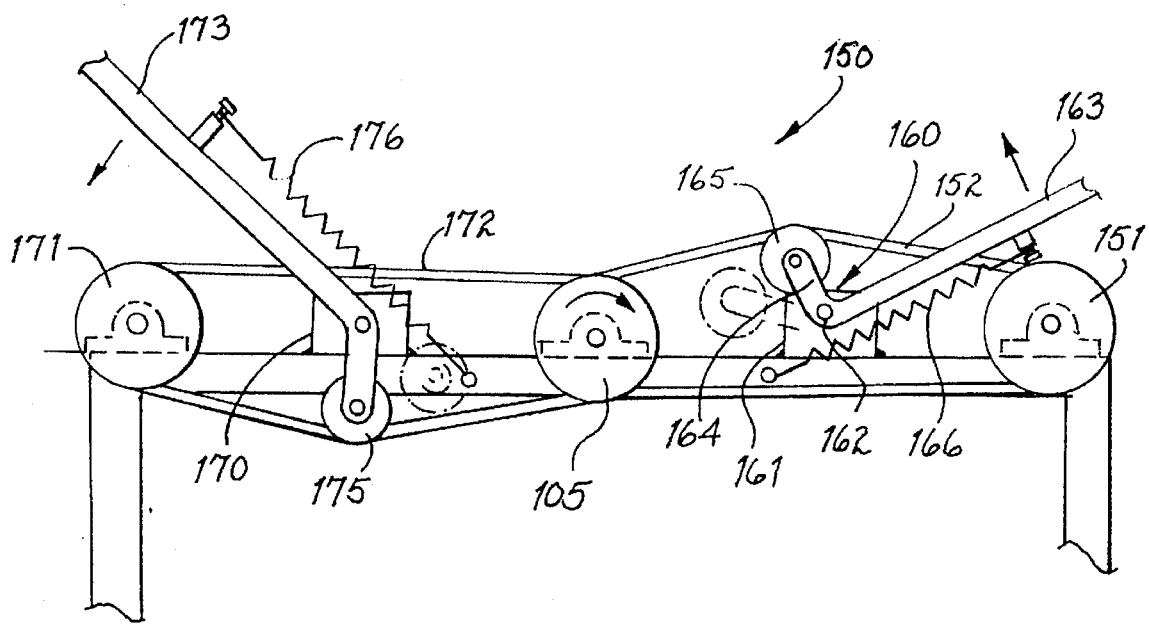
FIG. 6 is an elevational view of the pulley assembly taken along the lines A—A of FIG. 2.

In a preferred construction of the invention, the module drive mechanism 100 includes a modified station drive mechanism 150 as best seen in FIGS. 2,6. In this mode, a typical front station such as Station One 23 and the station to its rear, such as, Station Two 25, as laid out in FIG. 1, would preferably be driven by a station drive mechanism 150 as shown in FIGS. 2,6. As best seen in FIG. 6, the front station, such as station 23, would include a pulley 151 attached to a shaft which is affixed to a single drum encircling holders 50, a belt 152 coupling pulley 151 and one half of central double pulley 105 and a tensioner assembly 160. Tensioner assembly 160 includes a vertical support 161 affixed to a horizontal member of the frame 40 to which is pivotable connected 162 a movable arm 163 having an upwardly angled member 164 to which is rotatably attached pulley 165 and resilient hold down member 166 connected between vertical frame 40 and arm 163. In this embodiment of the pulley assembly the arm 163 is movable between a raised position disengaging pulley 165 from belt 152 and a lowered position coupling 165 to belt 152 to drive pulley 151 and its attached drum encircling holder 50. Resilient hold down 166 is positioned so as to move over center relative to pivot 162 to thereby hold arm 163 in its raised or lowered position until it is manually moved therefrom by the operator.

Unlike the embodiment of FIG. 1 where drive pulley 121 was affixed to a shaft connected to a pair of adjacent drum encircling holders 50 in stations 23,24, the preferred embodiment shown in FIG. 6 is configured to independently drive a single drum encircling holder 50 independently of any other drum encircling holders 50. With this construction each drum 200 may be independently rotated of all other drums allowing the operator to time the duration of each drum under the cooling spray independently of all other drums and replace it when it arrives at its preferred temperature of approximately 100° F. or room temperature, as desired.

By randomly sampling the temperature of the food contents in the center of a drum, such as, by manually interrupting a spinning operation and inserting a thermometer into the middle of the drum, it may be statistically determined for a given installation the average amount of time it takes to lower the temperature of the drum and its food contents to the desired point. With a statistical data base established by this trial and error method, it is possible to maintain a continuous operation of multiple stations with multiple drums being inserted and removed on a timed basis without interrupting the spinning of any other drum in the machine.

The station drive mechanism 170 of the adjacent rear station as seen in FIG. 6 is configured similarly to station drive mechanism 150 except that because of the direction of rotation of center double pulley 105, the tensioner assembly 160 is installed upside down relative to that of station drive mechanism 150. Accordingly, station drive mechanism 170 is operated by lowering arm 173 to move pulley 175 to a disengaged position from belt 172 and by raising arm 173 to a raised position engaging pulley 175 with belt 172 to drive pulley 171 attached to the rear drum encircling holders 50 of that station.

d. Sprayer Assembly

Figure 7:
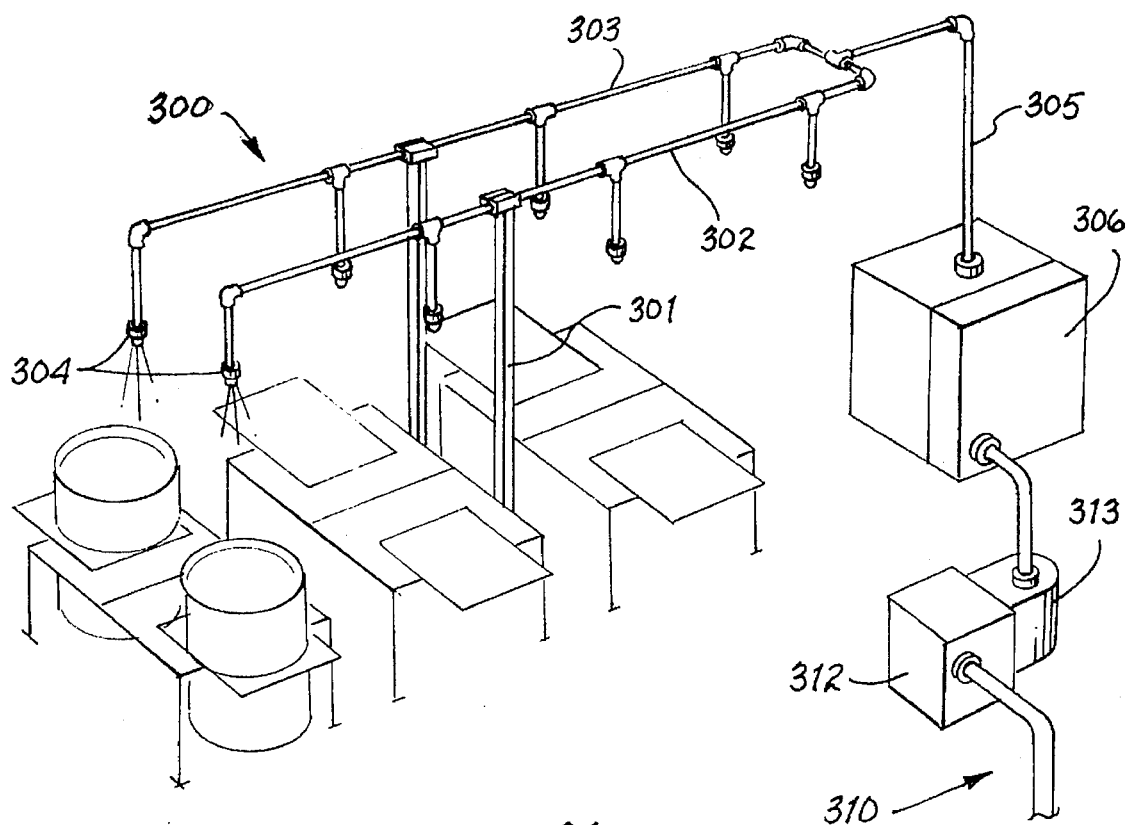
FIG. 7 is a perspective view of the cool water spraying system of the present invention.

The drum cooler machine 10 of the present invention includes a sprayer assembly 300 as best seen in FIG. 7. Preferably, the sprayer assembly 300 includes a plurality of vertical supports 301 supporting one spray bar 302 overhead the front row 21 of drum encircling holder 50 and a second spray bar 303 overhead the rear row 22 of drum encircling holders 50. Depending from the spray bars 302,303 are a plurality of sprayers 304 one each over each drum encircling holder 50. Connected to spray bars 302,303 is the water supply line 305 which is connected to a water cooler 306. Water cooler 306 is any conventional heat exchanger which is able to cool water to approximately 45° F. Connected to the water cooler 306 is a water supply system 310 which includes a water supply 307 (not shown), a water drain or collector 311 (not shown), a conventional filter 312, and a conventional recirculation pump 313.

e. Advantages of the Invention

What has been described above is a simple, durable, drum cooling machine each station of which may receive a hot, 55 gallon drum filled with food contents and cradle the drum securely in a dynamically balanced manner for increased rotation and agitation without excessive vibration or force in a multi-station configuration, but independently of the drums in any other stations, or in linked fashion, if desired. The machine allows for continuous operation of all stations without interrupting other stations. The loading and unloading of individual drums is reduced to a minimum time. The cooling is more rapid, efficient, and effective than previously obtainable. The system is closed and nothing is wasted.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A drum cooler comprising:

a support, a drum encircling holder having a central axis, rotatably mounted on each side on the support at the central axis, and having an openable and releasably latchable gate portion, a drive assembly mounted on the support and coupled to the drum holder for selectively rotating the drum holder about the drum holder central axis, and a water sprayer supported near the holder for spraying water onto the holder during rotation of the holder.

2. The drum cooler of claim 1 wherein the drum encircling holder further comprises:

a U-shaped frame the open end of which is closed by the gate.

3. The drum cooler of claim 2 wherein the drum encircling holder further comprises:

a plurality of vertical median supports mounted on the frame and the gate having inwardly slanted ends and adapted to support a drum by engaging a pair of central drum ribs.

4. The drum cooler of claim 3 further comprising:

a flexible, non-abrasive padding on the inboard side of the median supports.

5. The drum cooler of claim 1 wherein the drum encircling holder further comprises:

at least two support arms affixed together at one end, the gate being an additional support arm affixed to the two support arms at their other ends.

6. The drum cooler of claim 5 wherein the drum encircling holder further comprises:

a plurality of vertical median supports mounted on the support arms having inwardly slanted ends and adapted to support a drum by engaging a pair of central drum ribs.

7. The drum cooler of claim 6 wherein the drum encircling holder further comprises:

a flexible, non-abrasive padding on the inboard side of the median supports.

8. The drum cooler of claim 1 wherein the drive assembly further comprises:

a central drive shaft, a central pulley affixed to the central drive shaft, a pulley affixed to the drum holder, a belt coupling the central and holder pulleys, an intermediate pulley movable between a first position disengaged from the belt and a second position engaged with the belt for driving the holder pulley, and means for driving the central shaft.

9. The drum cooler of claim 8 wherein the drive assembly further comprises:

a spring mounted between the movable pulley and the support for resiliently biasing the movable pulley into the engaged position.

10. The drum cooler of claim 8 wherein the central pulley is a double pulley each half of which is used to drive a separate drum encircling holder.

11. The drum cooler of claim 8 further comprising:

the holder pulley affixed to an additional drum encircling holder rotatably mounted in an adjacent support, both drum holders being simultaneously rotated when the movable pulley is in the second position.

12. The drum cooler of claim 1 wherein the water sprayer further comprises:

an outlet supported above the holder for spraying water down onto and around the rotatably holder and a drum supported therein.

* * * * *